United States Patent
Smith (10) Patent No.: US 10,168,957 B2
(45) Date of Patent: Jan. 1, 2019

(54) DIRECTED PLACEMAT OF DATA IN MEMORY

(71) Applicant: Imagination Technologies Limited, Kings Langley (GB)

(72) Inventor: Christopher Philip Smith, Chepstow (GB)

(73) Assignee: Imagination Technologies Limited, Kings Langley (GB)

( * ) Notice: Subject to any disclaimer, the term of this patent is extended or adjusted under 35 U.S.C. 154(b) by 57 days.

(21) Appl. No.: 15/498,689

(22) Filed: Apr. 27, 2017

(65) Prior Publication Data

US 2017/0315755 A1    Nov. 2, 2017

(30) Foreign Application Priority Data

Apr. 28, 2016  (GB) .................................. 1607448.6

(51) Int. Cl.
*G06F 12/00* (2006.01)
*G06F 3/06* (2006.01)
*G06F 9/445* (2018.01)

(52) U.S. Cl.
CPC .......... *G06F 3/0659* (2013.01); *G06F 3/0604* (2013.01); *G06F 3/064* (2013.01); *G06F 3/0611* (2013.01); *G06F 3/0673* (2013.01); *G06F 9/44557* (2013.01)

(58) Field of Classification Search
None
See application file for complete search history.

(56) References Cited

U.S. PATENT DOCUMENTS

| | | | |
|---|---|---|---|
| 5,634,076 A | 5/1997 | Garde et al. | |
| 6,023,583 A | 2/2000 | Honda | |
| 7,784,042 B1 | 8/2010 | Lobo et al. | |
| 2010/0077175 A1* | 3/2010 | Wu | G06F 3/0611 711/172 |

* cited by examiner

*Primary Examiner* — John A Lane
(74) *Attorney, Agent, or Firm* — Vorys, Sater, Seymour and Pease LLP; Vincent M DeLuca (57) ABSTRACT

A method of storing computer executable instructions and data elements of a program in a plurality of memory blocks of an embedded system. The method includes receiving object code that comprises instructions that symbolically refer to one or more data elements; metadata that identifies the data elements in the object code; and a data element description that identifies each of the data elements as either a regular data element or a non-regular data element. Executable code is generated based the object code, metadata and the data element description that comprises computer executable instructions that refer to the data elements using an address in the memory, wherein the regular data elements are referenced by an address in a non-instruction memory block of the plurality of memory blocks and the non-regular data elements are referenced by an address in an instruction memory block. The executable code is then loaded into the memory of the embedded system.

20 Claims, 6 Drawing Sheets

DIRECTED PLACEMAT OF DATA IN MEMORY

BACKGROUND

A program executed by a computing-based system comprises a set of instructions that refer to one or more data elements. In particular the instructions tell the computing-based system (e.g. the processor of the computing-based system) which actions to perform on, or using, the data elements. The term "data element" is used herein to refer to a combination of bits or bytes that represent a separate item of information. Each data element is stored in an associated portion of memory.

In some computing-based systems, such as embedded systems, both the instructions and the data elements may be stored in core memory (a memory unit that is situated in close proximity to the processor) of the embedded system to allow quick access (e.g. one cycle access) to the instructions and data elements. The processor of the embedded system executes the stored instructions which cause the processor to access (e.g. write to, and read from) the data elements in the core memory.

In many clock cycles a processor executing such a program will need to access both instructions and data elements stored in the core memory. Accordingly, in many embedded systems the instructions are stored in a separate section of the core memory from the data elements so that both an instruction and a data element can be accessed in the same clock cycle.

The embodiments described below are provided by way of example only and are not limiting of implementations which solve any or all of the disadvantages of known embedded systems.

SUMMARY

This Summary is provided to introduce a selection of concepts in a simplified form that are further described below in the Detailed Description. This Summary is not intended to identify key features or essential features of the claimed subject matter, nor is it intended to limit the scope of the claimed subject matter.

Described herein are methods of storing computer executable instructions and data elements of a program in a plurality of memory blocks of an embedded system. The methods include receiving object code that comprises instructions that symbolically refer to one or more data elements; metadata that identifies the data elements in the object code; and a data element description that identifies each of the data elements as either a regular data element or a non-regular data element. Executable code is generated based on the object code, the metadata and the data element description that comprises computer executable instructions that refer to the data elements using an address of the memory, wherein the regular data elements are referenced by an address in a non-instruction memory block of the plurality of memory blocks and the non-regular data elements are referenced by an address in an instruction memory block of the plurality of memory blocks. The executable code is then loaded into the memory of the embedded system.

A first aspect provides a computer-implemented method of storing computer executable instructions and data elements of a program in a memory of an embedded system, the memory being divided into a plurality of memory blocks, the method comprising: receiving object code comprising instructions that symbolically refer to one or more data elements; receiving metadata that identifies the data elements in the object code; receiving a data element description that identifies each of the data elements as either a regular data element or a non-regular data element; generating, based on the object code, the metadata and the data element description, executable code that comprises computer executable instructions that refer to the one or more data elements using an address of the memory of the embedded system, wherein the regular data elements are referenced by an address in a non-instruction memory block of the plurality of memory blocks and the non-regular data elements are referenced by an address in an instruction memory block of the plurality of memory blocks; and loading the executable code into the memory of the embedded system.

A second aspect provides a system to store computer executable instructions and data elements of a program in a memory of an embedded system, the memory being divided into a plurality of memory blocks, the system comprising: a linker script generator configured to: receive object code comprising instructions that symbolically refer to one or more data elements; receive metadata that identifies the data elements in the object code; receive a data element description that identifies each of the data elements as either a regular data element or a non-regular data element; and generate a linker script to cause a linker to allocate non-regular data elements an address in an instruction memory block of the plurality of memory blocks and to allocate regular data elements an address in a non-instruction memory block of the plurality of memory blocks; a linker configured to: generate, based on the object code, the metadata and the linker script, executable code that comprises computer executable instructions that refer to the one or more data elements using an address of the memory, wherein the regular data elements are referenced by an address in a non-instruction memory block of the plurality of memory blocks and the non-regular data elements are referenced by an address in an instruction memory block of the plurality of memory blocks; and a loader configured to load the executable code into the memory of the embedded system.

A third aspect provides an embedded system configured to execute a program, the embedded system obtained by performing the method of the first aspect to load executable code representing the program into a memory of the embedded system.

A fourth aspect provides computer readable code configured to perform the steps of the method of the first aspect when the computer readable code is run on a computing-based device.

A fifth aspect provides a computer readable storage medium having encoded thereon the computer readable code of the fourth aspect.

The embedded system may be embodied in hardware on an integrated circuit. There may be provided a method of manufacturing, at an integrated circuit manufacturing system, an embedded system. There may be provided an integrated circuit definition dataset that, when processed in an integrated circuit manufacturing system, configures the system to manufacture an embedded system. There may be provided a non-transitory computer readable storage medium having stored thereon a computer readable description of an integrated circuit that, when processed, causes a layout processing system to generate a circuit layout description used in an integrated circuit manufacturing system to manufacture an embedded system.

There may be provided an integrated circuit manufacturing system comprising: a non-transitory computer readable storage medium having stored thereon a computer readable integrated circuit description that describes the embedded system; a layout processing system configured to process the integrated circuit description so as to generate a circuit layout description of an integrated circuit embodying the embedded system; and an integrated circuit generation system configured to manufacture the embedded system according to the circuit layout description.

There may be provided computer program code for performing a method as described herein. There may be provided non-transitory computer readable storage medium having stored thereon computer readable instructions that, when executed at a computing-based device, cause the computing-based device to perform the method as described herein.

The above features may be combined as appropriate, as would be apparent to a skilled person, and may be combined with any of the aspects of the examples described herein.

BRIEF DESCRIPTION OF THE DRAWINGS

Examples will now be described, in detail with reference to the accompanying drawings in which.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

As described above, to increase the performance of an embedded system designed to execute a particular program, the instructions of the program are typically stored separately from the data elements of the program. The instructions refer to the data elements and tell the embedded system (e.g. the processor of the embedded system) which actions to perform on, or using, the data elements. The term "data element" is used herein to refer to a combination of bits or bytes that represent a separate item of information. Examples of "data elements" include, but are not limited to, variables, arrays and buffers.

Figure 1:
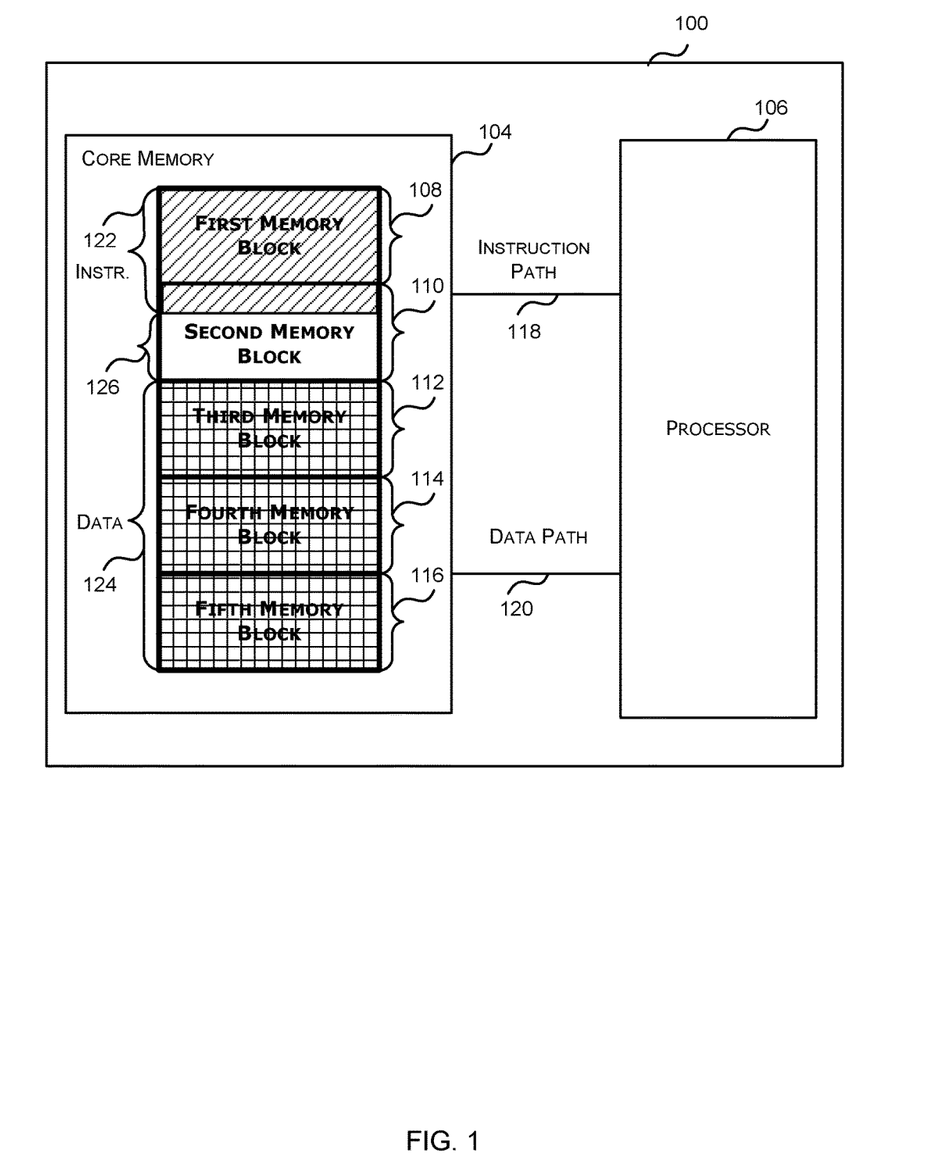
FIG. 1 is a block diagram of an example embedded system where instructions and data elements of a program are stored in separate memory blocks.

For example, reference is made to FIG. 1 which illustrates an example embedded system 100 for executing a program comprising computer executable instructions that refer to one or more data elements. An embedded system, in contrast to a general purpose computing-based system, is a computing-based system that is designed for a specific purpose, and is typically constrained in its size, power requirements and/or features in comparison to general purpose computing-based systems. For example, some embedded systems, such as the embedded system 100 of FIG. 1, do not include dedicated memory management hardware, such as a memory management unit (MMU), typical of a general purpose computing-based system. Embedded systems typically also have real-time computing constraints, giving additional importance to achieving high, but predictable performance. A non-limiting example of an embedded system is a radio processing unit (RPU) which is specifically designed to process radio signals.

The embedded system 100 comprises a core memory 104 for storing the computer executable instructions and the data elements of the program; and a processor 106 for executing the stored computer executable instructions which cause the processor 106 to access (e.g. write to, and read from) the stored data elements.

The term "core memory" is used herein to mean a memory unit that is situated in close proximity to the processor 106 to enable the processor 106 to quickly access the information (e.g. computer executable instructions and data elements) stored therein. For example, some core memories are designed to provide the processor 106 with single clock cycle access (e.g. read from, or write to) to information stored in the core memory 104. The core memory 104 may be implemented using any suitable type of memory such as, but not limited to, RAM or ROM.

To reduce access (i.e. read and write) time, the core memory 104 is divided or partitioned into memory blocks 108, 110, 112, 114, 116 (e.g. 64 kB (kilobyte) blocks). Each memory block represents a subset of the total core memory 104. The memory blocks 108, 110, 112, 114 and 116 may be the same size or may be different sizes. The memory blocks 108, 110, 112, 114 and 116 may form a contiguous block of memory; or the memory blocks 108, 110, 112, 114 and 116 may be separated from each other by other memory, modules or components. In the example shown in FIG. 1, the core memory 104 is divided into five equal-sized memory blocks 108, 110, 112, 114, 116 that form a contiguous block. However, it will be evident to a person of skill in the art that this is an example only and that the core memory 104 may be divided into more or fewer memory blocks and may not be contiguous.

When the processor 106 is executing the program (via the stored computer executable instructions) there will be many clock cycles in which the processor 106 will want to access both an instruction and a data element stored in the core memory 104. To allow the processor 106 to issue both an instruction access request and a data access request to the core memory 104 in the same clock cycle there are two paths or buses 118 and 120 between the processor 106 and the core memory 104. For example, in FIG. 1 there is an instruction path 118 for sending instruction access requests and a data path 120 for sending data access requests.

Since each memory block 108, 110, 112, 114 and 116 can typically only process one access request (e.g. a request to read or write) per clock cycle the computer executable instructions 122 and the data elements 124 are stored in separate memory blocks 108, 110, 112, 114, and 116. In the example of FIG. 1, the computer executable instructions 122 are stored in the first and second memory blocks 108 and 110 and the data elements 124 are stored in the third, fourth and fifth memory blocks 112, 114 and 116. By storing the computer executable instructions 122 in different memory blocks from the data elements 124, no instruction—data element pair will be stored in the same memory block. Accordingly no combination of instruction access request and data element access request cycle will conflict (i.e. attempt to access the same memory block in the same clock cycle). This guarantees that any combination of instruction access request and data element access request will be able to be processed in the same clock cycle.

A memory block (e.g. first and second memory blocks 108 and 110 of FIG. 1) that is used to store one or more computer executable instructions will be referred to herein as an instruction memory block or a memory block designated for storing instructions. The memory blocks which are not used to store computer executable instructions (e.g. third, fourth and fifth memory blocks 112, 114 and 116 of FIG. 1) will be referred to herein as non-instruction memory blocks, data memory blocks, or memory blocks designated for storing data.

The processor 106 is configured to execute the computer executable instructions 122 stored in the core memory 104 which causes the processor 106 to access (e.g. write to or read from) the data elements 124 stored in the core memory 104. The processor 106 may be a microprocessor, controller or any other suitable type of processor for processing computer executable instructions to control the operation of the embedded system 100.

While storing the data elements 124 and computer executable instructions 122 in the core memory 104 in this manner ensures that data elements 124 and computer executable instructions 122 stored in the core memory 104 can be accessed in the same clock cycle, many embedded systems have a limited amount of core memory 104 for storing computer executable instructions 122 and data elements 124. Thus if there are not enough computer executable instructions to fill up the last instruction memory block (e.g. the second memory block 110 in FIG. 1) such that a portion 126 of the memory block is unused, a significant amount of the core memory 104 may be wasted. For example, if the core memory is 320 kB (kilobyte) which is divided into five memory blocks of 64 kB each, and the computer executable instructions comprise 65 kB then the first memory block will be full, but only 1 kB of the second memory block will be used, leaving 63 kB (or almost 20%) of unused core memory.

Accordingly, described herein are methods for storing computer executable instructions and data elements in memory of an embedded system so that at least one data element of the program (e.g. a data element which is identified as being a low priority data element) is stored in the same memory block as a computer executable instruction of the program (e.g. stored in an instruction memory block). Access to a data element stored in an instruction memory block may be poorer or slower than access to a data element stored in a non-instruction or data memory block since an access request related to a data element stored in an instruction memory block may conflict with an instruction access request issued to the core memory 104 in the same clock cycle. However, access to a data element stored in an instruction memory block will still typically be better than if the data element were stored in non-core memory. Such an embedded system allows the core memory of an embedded system to be used more efficiently at a small performance cost (e.g. reduced performance for access to a subset of known data elements).

Where the programmer or designer of the program is given the ability to identify those data elements that are to be stored in an instruction memory block (e.g. by identifying them as low priority data elements) the programmer can design the program to take into account the potentially slower access time for these data elements and/or can ensure that critical data elements are not stored in an instruction memory block. Specifically, if the programmer or designer of the program can identify the data elements which may have slower access time, then the programmer or designer will know the worst case access time for each data element. This can provide significant improvements in performance over embedded systems that combine instructions and data elements in memory blocks by simply placing the data elements right after the instructions. In particular, in such systems the data elements that are placed in the same memory block as instructions would not be known in advance, and may vary each time the code is compiled, resulting in different performance.

Storing the instructions and data elements of the program in this manner has shown to be particularly effective in embedded systems which do not cache the instructions and data elements. This is because if an embedded system caches the instructions and the data elements then either or both of an instruction access request and a data element access request issued in the same clock cycle may be satisfied using the cached data allowing both access requests to be processed in the same clock cycle even if they are stored in the same memory block.

Storing the instructions and data elements of the program in this manner has also shown to be particularly effective in embedded systems with high performance memories (e.g. core memories) where conflicts between instruction accesses and data element accesses would have a significant impact on performance. This is because embedded systems with high performance memories (e.g. core memory) are designed to achieve ultra-high performance (e.g. single cycle access) and so conflicts between an instruction access and a data element access which could result in two-cycle access instead of single cycle access would significantly impact performance.

Figure 2:
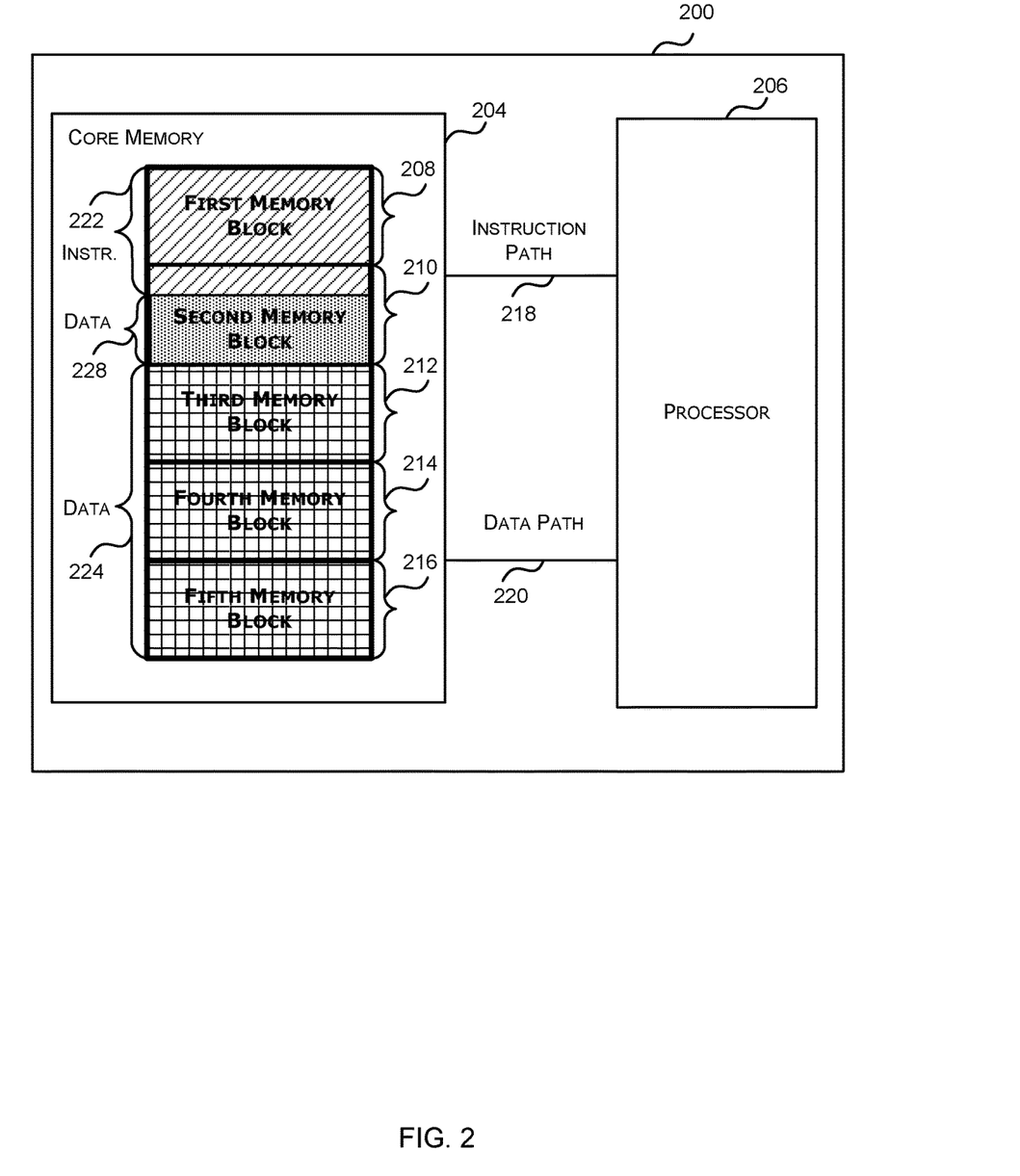
FIG. 2 is a block diagram of an example embedded system where one or more data elements of a program are stored in the same memory block as one or more instructions.

Reference is now made to FIG. 2 which illustrates an example embedded system 200 for executing a program comprising computer executable instructions 222 that refer to one or more data elements 224 and 228 wherein at least one of the data elements 228 is stored in an instruction memory block of the core memory.

The embedded system 200 comprises core memory 204 for storing the computer executable instructions 222 and the data elements 224 and 228 of the program; and a processor 206 for executing the stored computer executable instructions 222 which cause the processor 206 to access (e.g. write to, and read from) the stored data elements 224 and 228.

The core memory 204 corresponds to the core memory 104 described above with reference to FIG. 1. In particular, like the core memory 104, of FIG. 1, the core memory 204 is divided into a plurality of memory blocks 208, 210, 212, 214 and 216 as described above with reference to FIG. 1.

One or more of the memory blocks (e.g. the first and second memory blocks 208 and 210 in FIG. 2) are instruction memory blocks—i.e. are used to store computer executable instructions of the program; and the remaining memory blocks (e.g. the third, fourth and fifth memory blocks 212, 214 and 216 of FIG. 2) are non-instruction memory blocks or data memory blocks—i.e. computer executable instructions of the program are not stored in these memory blocks.

The difference between the core memory 204 of FIG. 2 and the core memory 104 of FIG. 1 is that one or more data elements 228 of the program are stored in an instruction memory block (e.g. second memory block 210 of FIG. 2) of the core memory 204 whereas in the core memory 104 of FIG. 1 all data elements are stored in non-instruction memory blocks of the core memory 104. In other words in the core memory 104 of FIG. 1 the data elements and computer executable instructions are stored in separate memory blocks whereas in the core memory 204 of FIG. 2 at least one of the data elements 228 is stored in the same memory block (e.g. the second memory block 210) as computer executable instructions.

In some examples, the one or more data elements 228 of the program that are stored in an instruction memory block are those data elements identified as being non-regular data elements. For example, in FIG. 2, the data elements 228 that are identified as low priority data elements may be stored in an instruction memory block (e.g. the second memory block 210). The programmer may specify data elements 228 as being non-regular data elements (e.g. low priority data elements) at either symbol or section granularity. By specifying data elements as non-regular data elements (e.g. low priority data elements) at a section level such an indication can be made directly in the higher level code, such as C code.

In such examples, all other data elements 224 (i.e. data elements which are not identified as being a non-regular data element (e.g. not identified as a low priority data element)), which will be referred to herein as regular data elements 224, are stored in non-instruction or data memory blocks (e.g. third, fourth and fifth memory block 212, 214, 216). In some cases the data elements 228 that are identified as being non-regular data elements (e.g. low priority data elements) are only stored in an instruction memory block if all of the non-instruction memory blocks are full. This ensures that reduced performance for access to these data elements is not imposed unless it is required. Although such an implementation would not allow the programmer or designer to know in advance which data elements will be placed in an instruction memory block, the performance benefits achieved by only placing data elements in an instruction memory block when the non-instruction memory blocks are full may outweigh the advantage of determinism in some cases.

Figure 3:
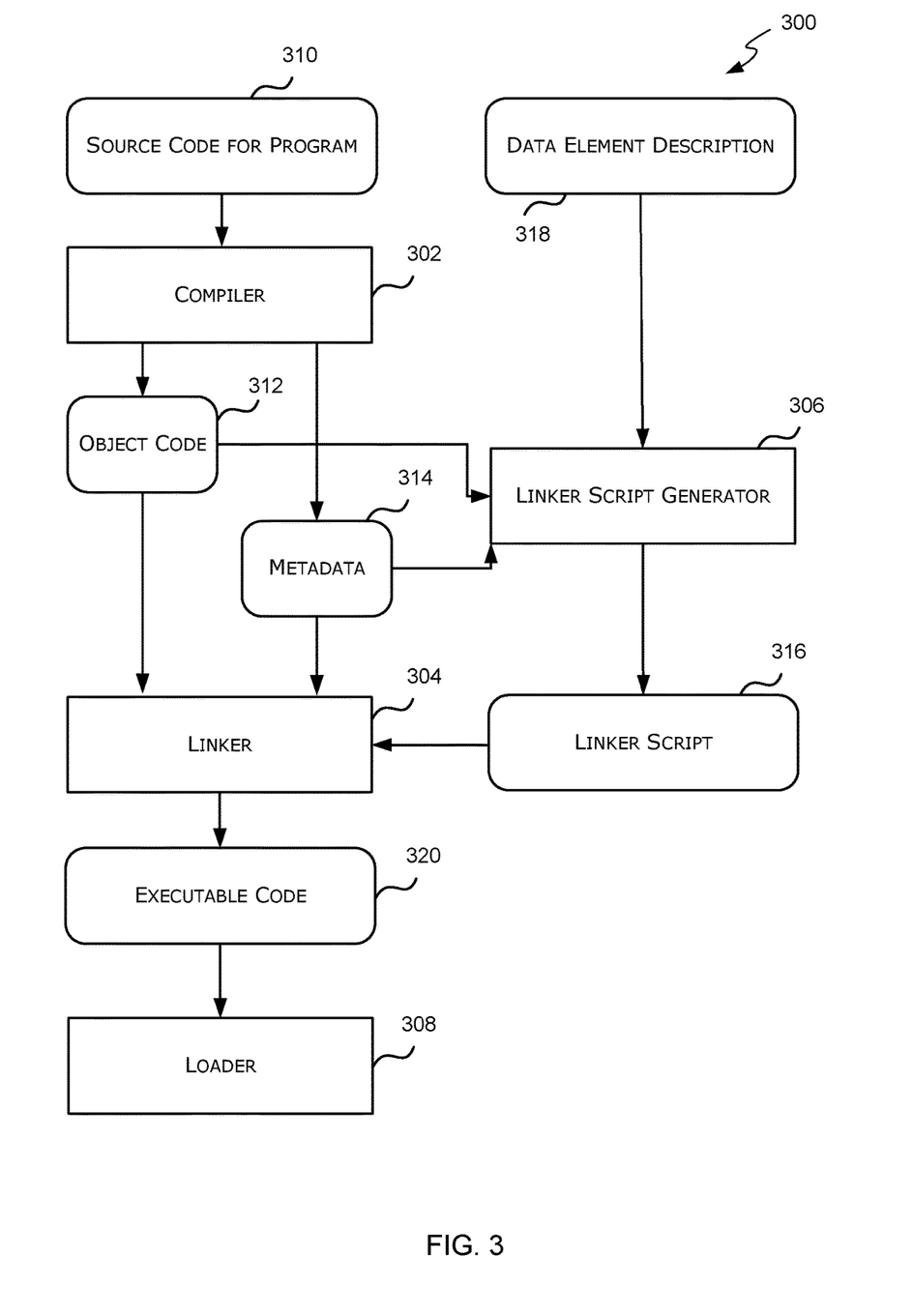
FIG. 3 is a block diagram of an example system for storing instructions and data elements of a program in memory so that one or more data elements are stored in the same memory block as one or more instructions.

In other examples, the data elements that are to be stored in an instruction memory block may be identified in other manners. For example, a compiler (e.g. compiler 302 described below) may be configured to use a profile-based optimization to identify "hot" or "cold" data elements. As is known to those of skill in the art, profile-based optimization comprises compiling a program with extra profiling options which provide information (e.g. profile data) on how often particular lines of code are executed at runtime. The number of times each data element is accessed can then be ascertained from the profile data. The data elements that are accessed a threshold number of times or more may then be classified, by for example a compiler, as "hot" data elements and data element that are accessed less than the threshold number of times may be classified as "cold" data elements. The "cold" data elements may then be identified as the data elements to be stored in an instruction memory block.

The processor 206 of FIG. 2 generally corresponds to the processor 106 of FIG. 1. In particular, the processor 206 of FIG. 2, like the processor 106 of FIG. 1, is configured to execute the computer executable instructions 222 stored in the core memory 204 which cause the processor 206 to access (i.e. write to, and/or read from) the data elements 224 and 228 stored in the core memory 204.

The processor 206 of FIG. 2, like the processor 106 of FIG. 1, is connected to the core memory 204 via two buses or paths 218 and 220—an instruction path 218 and a data path 220—which allows both an instruction access request and a data element access request to be issued to the core memory 204 in the same clock cycle. As described above, in some examples only one access request per memory block 208, 210, 212, 214, 216 can be serviced per clock cycle. Two access requests that are made to the same memory block 208, 210, 212, 214, or 216 in the same clock cycle are said to be conflicting memory access requests.

Since any data element 224 stored in a non-instruction or data memory block of the core memory 204 is guaranteed not be in the same memory block as an instruction, any access request for a data element 224 stored in a non-instruction or data memory block (e.g. third, fourth, and fifth memory blocks 212, 214 and 216) will not conflict with an instruction access request and thus both the instruction access request and the data element access request will be able to be processed in the same clock cycle. However, any data element 228 stored in an instruction memory block (e.g. the second memory block 210) of the core memory 204 is in the same memory block as at least one instruction, therefore an access request related to a data element 228 stored in an instruction memory block may conflict with an instruction access request issued in the same clock cycle.

Where such a conflict occurs, the processor 206 may "stall" (e.g. cease execution of instructions) until the instruction access request and the data element access request are separately processed. This increases the access time and decreases the access performance for data elements 228 stored in an instruction memory block (e.g. the second memory block 210). Accordingly access requests related to data elements 224 stored in a non-instruction or data memory block (e.g. third, fourth, and fifth memory blocks 212, 214 and 216) may have better or faster performance than access requests related to data elements 228 stored in an instruction memory block (e.g. the second memory block 210).

However, since the programmer has the ability to specify which data elements are to be stored in an instruction memory block (e.g. by identifying the data element as a non-regular (e.g. low priority) data element) the programmer can ensure that only non-critical data elements are stored in an instruction memory block; and/or the programmer can adapt the program to account for a potential delay in accessing such a data element.

It will be evident to a person of skill in the art that the embedded systems 100 and 200 of FIGS. 1 and 2 may also comprise other components not shown.

Reference is now made to FIG. 3 which shows an example system 300 for storing a program in the core memory of an embedded system, such as the embedded system 200 of FIG. 2, so that at least one data element is stored in the same memory block as a computer executable instruction. The system 300 comprises a compiler 302, a linker 304, a linker script generator 306 and a loader 308. The system 300 may be implemented, for example, using a general purpose computer, such as computing-based device 500 described below with reference to FIG. 5.

The compiler 302 is a software program or tool that is configured to convert source code into object code. In this case the compiler 302 receives the source code 310 for the program and translates it into object code 312. As is known to those of a skill in the art source code 310 is a description of a program in a high-level programming language, such as, but not limited to C, which is readable by humans, but not a processor. In contrast, object code 312 is a description of a program in a lower level language, such as assembly language or machine language, which is understood by a processor.

While the object code 312 is in a format that a processor can understand the object code 312 is not typically in a form that can be executed by a processor. Specifically, the object code 312 does not typically include concrete references to the locations in memory of the data elements which are required for execution by the processor of an embedded system, such as the embedded system 200 of FIG. 2, that does not have dedicated memory management hardware. In contrast, the object code 312 typically symbolically refers to the data elements—in other words the object code 312 refers to a data element by name instead of by reference to a location in memory.

The compiler 302 also generates metadata 314 that identifies all the symbols in the object code 312 and their type (e.g. computer executable instructions (e.g. "text"), initialised data, uninitialised data, read-only data, etc.) and size. In some cases the compiler 302 generates a single file, such as an executable and linkable format (ELF) file, that contains both the object code 312 and the metadata 314.

The linker 304 is a software program or tool configured to generate executable code from object code. In this case the linker 304 receives the object code 312 and the metadata 314 generated by the compiler 302, and links the object code 312 together; allocates addresses in the core memory to the instructions and the data elements in the object code 312; and updates the object code to refer to the final allocated addresses of the data elements.

Generally a linker uses a linker script to allocate addresses in memory to aspects of the program (e.g. computer executable instructions and data elements). As is known to those of skill in the art a linker script specifies where different aspects of the program (e.g. computer executable instructions and data elements) are to be stored in memory. For example, the following is an example of a basic linker script which tells the linker 304 to place the instructions (text) at address 0x10000 and to place the data at address 0x8000000.

```
SECTIONS
{
    . = 0x10000;
    .text : { *(.text) }
    . = 0x8000000;
    .data : { *(.data) }
}
```

In the embodiments described herein a linker script generator 306 generates a linker script that causes the linker 304 to map the regular data elements to non-instruction memory blocks and the non-regular data elements (e.g. low-priority data elements) to instruction memory blocks.

The linker script generator 306 is a software program or tool that is configured to generate a linker script based on one or more inputs. In this case the linker script generator 306 receives the object code 312 and the metadata 314 generated by the compiler 302 which enable the linker script generator 306 to identify the computer executable instructions and data elements and determine their size. Once the linker script generator has identified the computer executable instructions and their size the linker script generator may use this information to designate one or more of the memory blocks of the core memory as instruction memory blocks and one or more of the memory blocks of the core memory as non-instruction memory blocks. For example, the linker script generator may determine based on the number and size of the computer executable instructions how many of the memory blocks of the core memory are required to store all of the computer executable instructions. Those memory blocks may then be designated as the instruction memory blocks and the remaining memory blocks may be designated as the non-instruction memory blocks.

The linker script generator 306 also receives a data element description 318 which identifies which data elements can be placed in an instruction memory block. In some cases the data element description 318 classifies the data elements as either regular data element or non-regular (e.g. low priority) data elements where the non-regular data elements are those that can be placed in an instruction memory block. In some examples, the data element description 318 may be implemented as a Python script, however, it will be evident to a person of skill in the art that this is an example only and the data element description 318 may be implemented in any suitable format that can be understood by the linker script generator 306.

The data element description 318 (e.g. Python script) is generally generated by a programmer or developer of the source code 310, but, as discussed above, the data element description 318 may be generated automatically from the source code. For example, the compiler (or other component) may be configured to analyze the source code 310 and/or object code 312 to identify rarely accessed data elements.

Where the data element description 318 is generated by the programmer or developer, the programmer or developer may, for example, identify data elements that are only used once at startup and then ignored as low priority data elements because any performance hit (e.g. access latency) related to storing those data elements in an instruction memory block may only be incurred once; and/or the programmer or developer may, for example, identify data elements associated with debugging as low priority data elements since the speed at which debugging data elements are written to is not critical to program performance.

The linker script generator 306 uses the metadata 314 to identify the data elements and their size. The linker script generator 306 then uses the data element description 318 to identify which of those data elements can be stored in an instruction memory block and which of the data elements should be stored in a non-instruction memory block. The linker script generator 306 then generates a linker script 316 to cause the linker 304 to allocate addresses in a non-instruction memory block to the regular data elements, and to allocate addresses in an instruction memory block to the non-regular (e.g. low priority) data elements.

The following is an example linker script 316 that may be generated by the linker script generator 306:

```
SECTIONS
{
    .text
    {
        *(.text)
    }>ram
    .neardata /* Unaligned, straight after the text */
    {
        *(.low_pri_element1)
        *(.low_pri_element2)
    }>ram
    .data ALIGN(0x1000)
    {
        *(.data)
    }>ram
}
```

As is known to those of skill in the art the above linker script indicates that the computer executable instructions (.text) are to be placed first in memory, which is to be immediately following by the "neardata" section which comprises the low priority data elements (e.g. .low_pri_element1 and .low_pri_element2). The regular data elements (.data) are then are aligned with the next multiple of 4 kB (ALIGN (0x1000)). For example, if the computer executable instructions and the low priority data elements require 3 kB, then the regular data elements will start at exactly 4 kB. If, however, the computer executable instructions and the low priority data elements require 7 kB, then the regular data elements will start at exactly 8 kB. If the memory blocks are each 4 kB then such a linker script causes the regular data elements to be placed in the next free memory block after the computer executable instructions and the low priority data elements.

The linker script 316 may also include information describing the layout of the memory (e.g. core memory) in which the computer executable instructions and the data elements are to be stored which is used by the linker 304 to map the elements of the program to memory addresses. In particular the linker script 316 may have a MEMORY portion which specifies exactly which memory regions are available and their properties. This information may be generated from a memory description (e.g. Python script) input to the linker script generator 306.

The linker script 316 generated by the linker script generator 306 is provided to the linker 304. The linker 304 uses the linker script 316 to allocate addresses to the data elements in the object code 312. In particular, the linker script 316 causes the linker 304 to allocate the regular data elements an address in a non-instruction memory block of the plurality of memory blocks, and, to allocate the non-regular data elements an address in an instruction memory block. The linker 304 then updates the object code 312 to include references to those addresses and saves the updated object code as executable code 320. As a result the executable code 320 includes computer executable instructions representing the program wherein the regular data elements are referenced by an address in a non-instruction memory block of the plurality of memory blocks and the non-regular data elements are referenced by an address in an instruction memory block.

In some cases, where the program refers to initialised data elements (i.e. a data element that has an initial value set at compile time) the executable code 320 may also include predefined initial values for the initialised data elements. Initialised data elements can be contrasted with uninitialised data elements which are assigned a portion of memory that is a certain size, but are initially set to zero (i.e. they do not have an initial value set at compile time).

The executable code 320 is then provided to the loader 308.

The loader 308 is a software program or tool that is configured to load an executable file into memory. In this case the loader receives the executable code 320 generated by the linker 304 and loads the executable code 320 (i.e. computer executable instructions) into the core memory. In some cases the executable code 320 (e.g. an executable linkable format (ELF) file)) may comprise metadata that indicates, amongst other things, where in the memory the executable code 320 should be loaded. In other cases the loader 308 may be run on the embedded system (e.g. embedded system 200) itself and the boot image of the embedded system may include metadata that indicates where in the memory the executable code 320 should be loaded.

Correctly mapping the data elements to the core memory can be quite complicated depending on the type of processor 206 because some processors 206 use multiple independent aliases to access the same physical memory. For example, some processors are configured to use a cached alias and/or a write-combined alias (e.g. to optimise access speed) to access the same part of the core memory. Therefore it is important that different program components (executable instructions and data elements) are not allocated to the same physical memory accidentally via two different aliases.

By using the linker script generator 306 to generate a linker script 316 that causes the linker 304 to allocate regular data elements addresses in a non-instruction memory block; and allocate non-regular data elements addresses in an instruction memory block, the programmer can simply identify data elements which can be placed in instruction memory blocks (e.g. by identifying them as low priority data elements) and leave the linker script generator 306 to identify the appropriate mappings between the data elements and addresses of the core memory.

An example method for generating a linker script 316 which may be implemented by the linker script generator 306 is described below with reference to FIG. 4.

Figure 4:
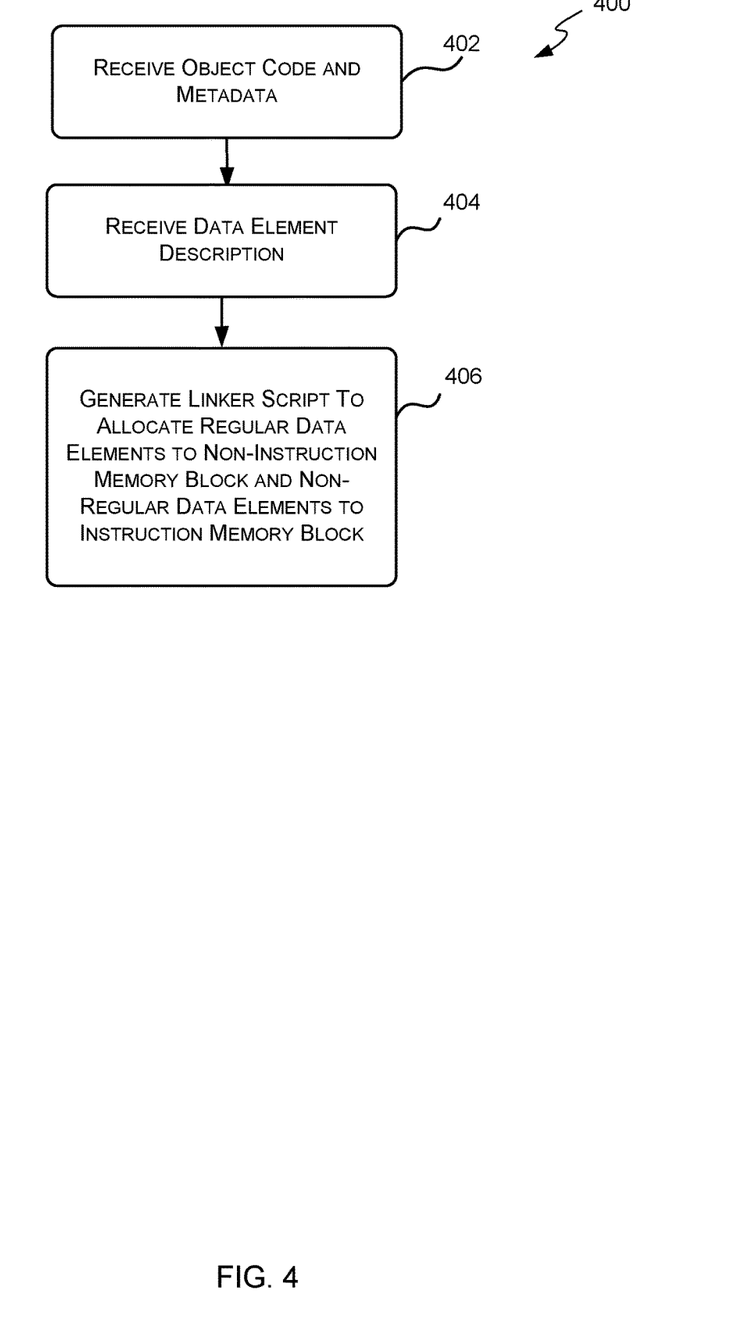
FIG. 4 is a flow diagram of an example method of generating a linker script that will cause one or more data elements of a program to be stored in the same memory block as one or more instructions of the program.

Reference is now made to FIG. 4 which illustrates a flow diagram of an example method 400 of generating a linker script for a program that will cause at least one identified data element of the program to be stored in an instruction memory block of the core memory of the embedded system. The method 400 may be executed by the linker script generator 306 of FIG. 3.

The method 400 begins at block 402, where the linker script generator 306 receives the object code 312 and the metadata 314 of the program. As described above, the object code 312 is a description of the program in a lower level language, such as assembly language or machine language, which is understood by a processor; and the metadata 314 identifies all the symbols in the object code 312 and their type (e.g. computer executable instructions (e.g. "text"), initialised data, uninitialised data, read-only data, etc.) and size. In some cases the linker script generator 306 receives a single file, such as an executable and linkable format (ELF) file, that contains both the object code 312 and the metadata 314.

At block 404 the linker script generator 306 receives a data element description 318. As described above, the data element description 318 identifies which data elements can be placed in an instruction memory block. In some cases the data element description 318 classifies the data elements as either regular data elements or non-regular (e.g. low priority) data elements, where the non-regular data elements are those that can be placed in an instruction memory block. In some examples, the data element description 318 may be implemented as a Python script, however, it will be evident to a person of skill in the art that this is an example only and the data element description 318 may be implemented in any suitable format that can be understood by the linker script generator 306.

At block 408 the linker script generator 306 generates, based on the object code 312, the metadata 314, and the data element description 318, a linker script 316 to cause a linker (e.g. linker 304) to: (i) allocate addresses in instruction memory blocks of the core memory to the computer executable instructions; (ii) allocate addresses in non-instruction memory blocks to the regular data elements; and (iii) allocate addresses in an instruction memory block to the non-regular (e.g. low priority) data elements. In particular, the linker script generator 306 uses the metadata 314 to identify the computer executable instructions and the data elements and their size. The linker script generator 306 then uses the data element description 318 to identify which of those data elements can be stored in an instruction memory block and which of the data elements should be stored in a non-instruction memory block.

Once the linker script 316 has been generated the method 400 ends and the linker script 316 can be used by a linker, such as linker 304, to generate executable code from the object code wherein the regular data elements in the object code have been assigned addresses in non-instruction memory block of the core memory and the non-regular (e.g. low priority) data elements have been assigned. The executable code can then be loaded into the core memory by a loader 308. When the executable code stored in the core memory is then executed by the processor it will cause the processor to use the non-instruction memory blocks to store and access the regular data elements; and to use an instruction memory block to access the non-regular (e.g. low priority) data elements.

While the methods and systems described above have been described in relation to storing at least one data element in an instruction memory block and at least one data element in non-instruction memory block of a core memory it will be evident to a person of skill in the art that the methods and techniques described herein can be equally applied to any type of memory which is shared between instructions and data elements and is not limited to storing instructions and data elements in core memory specifically. However, using the methods and techniques herein to allocate core memory to computer executable instructions and data elements can provide a significant improvement in performance of an embedded system since adding an additional cycle access time to single cycle memory can have a significant impact.

Figure 5:
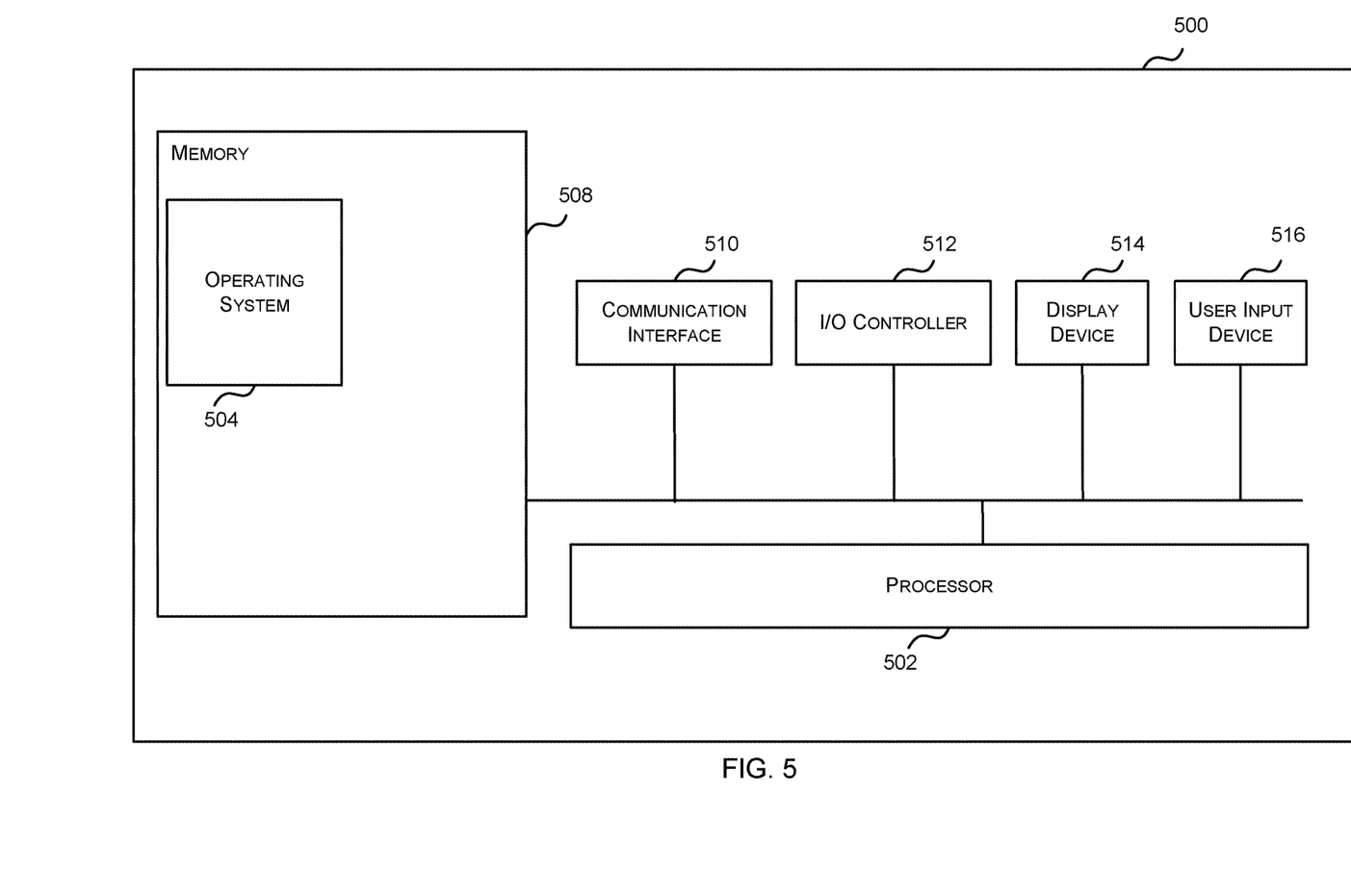
FIG. 5 is a block diagram of an example computing-based device.

FIG. 5 illustrates various components of an exemplary computing-based device 500 which may be implemented as any form of a computing and/or electronic device, and in which embodiments of the system 300 of FIG. 3 and the method of FIG. 4 may be implemented.

Computing-based device 500 comprises one or more processors 502 which may be microprocessors, controllers or any other suitable type of processors for processing computer executable instructions to control the operation of the device in order to generate executable code in accordance with the methods and systems described herein. In some examples, for example where a system on a chip architecture is used, the processors 502 may include one or more fixed function blocks (also referred to as accelerators) which implement a part of the methods described herein in hardware (rather than software or firmware). Platform software comprising an operating system 504 or any other suitable platform software may be provided at the computing-based device to enable application software (e.g. a compiler or linker) to be executed on the device.

The computer executable instructions may be provided using any computer-readable media that is accessible by computing based device 500. Computer-readable media may include, for example, computer storage media such as memory 508 and communications media. Computer storage media (i.e. non-transitory machine readable media), such as memory 508, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (i.e. non-transitory machine readable media, e.g. memory 508) is shown within the computing-based device 500 it will be appreciated that the storage may be distributed or located remotely and accessed via a network or other communication link (e.g. using communication interface 510).

The computing-based device 500 also comprises an input/output controller 512 arranged to output display information to a display device 514 which may be separate from or integral to the computing-based device 500. The display information may provide a graphical user interface. The input/output controller 512 is also arranged to receive and process input from one or more devices, such as a user input device 516 (e.g. a mouse or a keyboard). In an embodiment the display device 514 may also act as the user input device 516 if it is a touch sensitive display device. The input/output controller 513 may also output data to devices other than the display device, e.g. a locally connected printing device (not shown in FIG. 5).

Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code, computer readable instructions, and computer executable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computing-based device at which the executable code is supported to perform the tasks specified by the code.

A processor, computer, computer system, computing-based device, or computing-based system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), physics processing units (PPUs), digital signal processors (DSPs), general purpose processors (e.g. a general purpose GPU), microprocessors, any processing unit which is designed to accelerate tasks outside of a CPU, etc. A computer, computer system, computing-based device, or computing-based system may comprise one or more processors. Those skilled in the art will realise that such processing capabilities are incorporated into many different devices and therefore the term 'computer' includes set top boxes, media players, digital radios, PCs, servers, mobile telephones, personal digital assistants and many other devices.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture an embedded system as described herein. An integrated circuit definition dataset may be, for example, an integrated circuit description.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture an embedded system will now be described with respect to FIG. 6.

Figure 6:
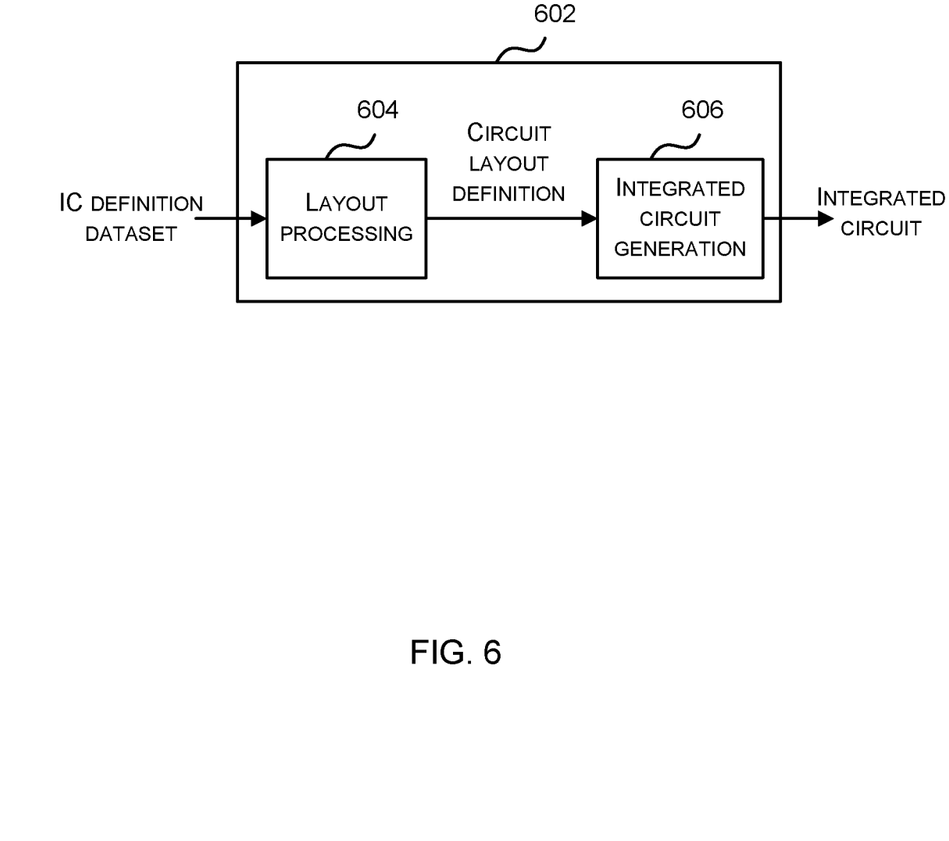
FIG. 6 is a block diagram of an example integrated circuit manufacturing system.

FIG. 6 shows an example of an integrated circuit (IC) manufacturing system 602 which comprises a layout processing system 604 and an integrated circuit generation system 606. The IC manufacturing system 602 is configured to receive an IC definition dataset (e.g. defining an embedded system 200 as described in any of the examples herein), process the IC definition dataset, and generate an IC according to the IC definition dataset (e.g. which embodies an embedded system as described in any of the examples herein). The processing of the IC definition dataset configures the IC manufacturing system 602 to manufacture an integrated circuit embodying an embedded system 200 as described in any of the examples herein.

The layout processing system 604 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 604 has determined the circuit layout it may output a circuit layout definition to the IC generation system 606. A circuit layout definition may be, for example, a circuit layout description.

The IC generation system 606 generates an IC according to the circuit layout definition, as is known in the art. For example, the IC generation system 606 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 606 may be in the form of computer-readable code which the IC generation system 606 can use to form a suitable mask for use in generating an IC.

The different processes performed by the IC manufacturing system 602 may be implemented all in one location, e.g. by one party. Alternatively, the IC manufacturing system 602 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture an embedded system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 6 by an integrated circuit manufacturing definition dataset may cause an embedded system as described herein to be manufactured.

In some examples, an integrated circuit definition dataset could include software which runs on hardware defined at the dataset or in combination with hardware defined at the dataset. In the example shown in FIG. 6, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilising conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

The invention claimed is:

1. A computer-implemented method of storing computer executable instructions and data elements of a program in a memory of an embedded system, the memory being divided into a plurality of memory blocks, the method comprising:
   receiving object code comprising instructions that symbolically refer to one or more data elements;
   receiving metadata that identifies the data elements in the object code;
   receiving a data element description that identifies each of the data elements as either a regular data element or a non-regular data element;
   generating, based on the object code, the metadata and the data element description, executable code that comprises computer executable instructions that refer to the one or more data elements using an address in the memory of the embedded system, wherein the regular data elements are referenced by an address in a non-instruction memory block of the plurality of memory blocks and the non-regular data elements are referenced by an address in an instruction memory block of the plurality of memory blocks; and
   loading the executable code into the memory of the embedded system.

2. The method of claim 1, wherein generating the executable code comprises:
   generating, based on the object code, the metadata and the data element description, a linker script that causes a linker to allocate the regular data elements an address in an a non-instruction memory block of the plurality of memory blocks and allocate the non-regular data elements an address in an instruction memory block of the plurality of memory blocks; and
   generating, using a linker, the executable code from the object code, the metadata and the generated linker script.

3. The method of claim 2, wherein generating the linker script comprises designating one or more of the plurality of memory blocks as an instruction memory block based on a number and a size of the instructions in the object code.

4. The method of claim 3, wherein generating the linker script further comprises designating the memory blocks of the plurality of memory blocks that were not designated as an instruction memory block as non-instruction memory blocks.

5. The method of claim 1, wherein an instruction memory block is a memory block that is used to store one or more computer executable instructions.

6. The method of claim 1, wherein a non-instruction memory block is a memory block that is not used to store one or more computer executable instructions.

7. The method of claim 1, wherein the embedded system comprises a processor and execution of the executable code by the processor causes the processor to: access the regular data elements in a non-instruction memory block of the plurality of memory blocks, and access the non-regular data elements in an instruction memory block of the plurality of memory blocks.

8. The method of claim 7, further comprising executing the executable code loaded into memory using the processor of the embedded system which causes the processor to: access the regular data elements in a non-instruction memory block of the plurality of memory blocks, and access the non-regular data elements in an instruction memory block of the plurality of memory blocks.

9. The method of claim 7, wherein accessing a data element in a memory block comprises writing data to and/or reading data from the memory block.

10. The method of claim 1, wherein a non-regular data element is a low-priority data element.

11. The method of claim 1, wherein the embedded system is a radio processing unit.

12. An embedded system configured to execute a program, the embedded system obtained by performing the method as set forth in claim 1 to load executable code representing the program into a memory of the embedded system.

13. A system to store computer executable instructions and data elements of a program in a memory of an embedded system, the memory being divided into a plurality of memory blocks, the system comprising:
   a linker script generator configured to:
      receive object code comprising instructions that symbolically refer to one or more data elements;
      receive metadata that identifies the data elements in the object code;
      receive a data element description that identifies each of the data elements as either a regular data element or a non-regular data element; and
      generate a linker script to cause a linker to allocate non-regular data elements an address in an instruction memory block of the plurality of memory blocks and to allocate regular data elements an address in a non-instruction memory block of the plurality of memory blocks;
   a linker configured to:
      generate, based on the object code, the metadata and the linker script, executable code that comprises computer executable instructions that refer to the one or more data elements using an address of the memory, wherein the regular data elements are referenced by an address in a non-instruction memory block of the plurality of memory blocks and the non-regular data elements are referenced by an address in an instruction memory block of the plurality of memory blocks; and
   a loader configured to load the executable code into the memory of the embedded system.

14. The system of claim 13, wherein the linker script generator is configured to generate the linker script by designating one or more of the plurality of memory blocks as an instruction memory block based on a number and a size of the instructions in the object code.

15. The system of claim 14, wherein the linker script generator is further configured to generate the linker script by designating the memory blocks of the plurality of memory blocks that were not designated as an instruction memory block as non-instruction memory blocks.

16. The system of claim 13, wherein an instruction memory block is a memory block that is used to store one or more computer executable instructions.

17. The system of claim 13, wherein a non-instruction memory block is a memory block that is not used to store one or more computer executable instructions.

18. The system of claim 13, further comprising the embedded system wherein the embedded system comprises a processor and execution of the executable code by the processor causes the processor to: access the regular data elements in a non-instruction memory block of the plurality of memory blocks, and access the non-regular data elements in an instruction memory block of the plurality of memory blocks.

19. The system of claim 18, wherein accessing a data element in a memory block comprises writing data to and/or reading data from the memory block.

20. A non-transitory computer readable storage medium having stored thereon computer readable instructions that, when executed at a computing-based device, cause the computing-based device to perform the method of:
- receiving object code comprising instructions that symbolically refer to one or more data elements;
- receiving metadata that identifies the data elements in the object code;
- receiving a data element description that identifies each of the data elements as either a regular data element or a non-regular data element;
- generating, based on the object code, the metadata and the data element description, executable code that comprises computer executable instructions that refer to the one or more data elements using an address in memory of the embedded system, wherein the regular data elements are referenced by an address in a non-instruction memory block of the memory of the embedded system and the non-regular data elements are referenced by an address in an instruction memory block of the memory of the embedded system; and
- loading the executable code into the memory of the embedded system.

* * * * *